(No Model.) 2 Sheets—Sheet 2.
C. M. DU PUY.
MOLDING PLASTIC MATERIAL.
No. 296,825. Patented Apr. 15, 1884.
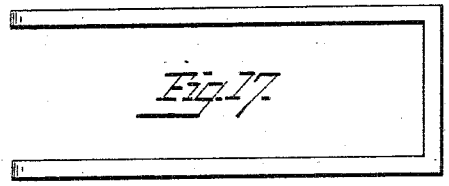
Fig. 17.
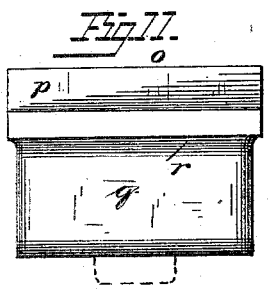
Fig. 11.
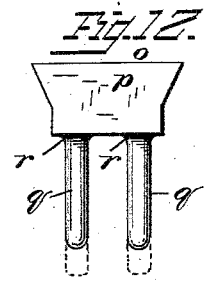
Fig. 12.
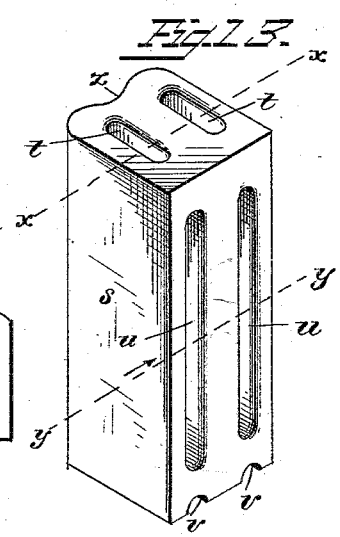
Fig. 13.
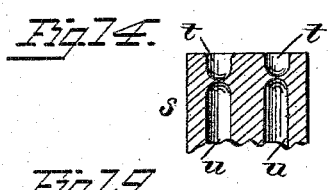
Fig. 14.
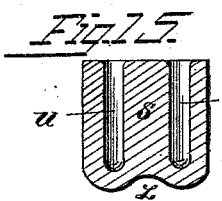
Fig. 15.
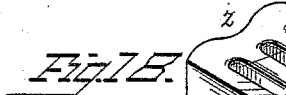
Fig. 18.
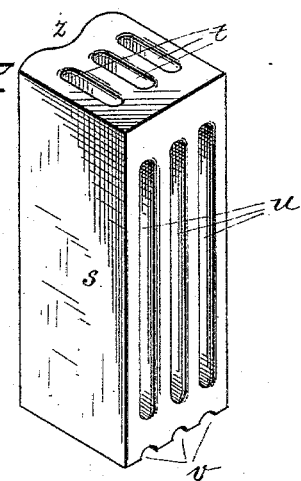
Fig. 16.
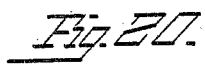
Fig. 19.
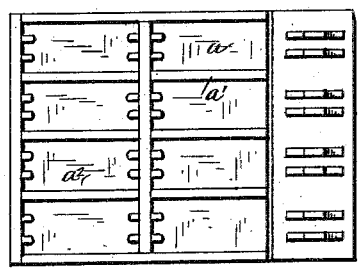
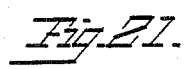
Fig. 20.
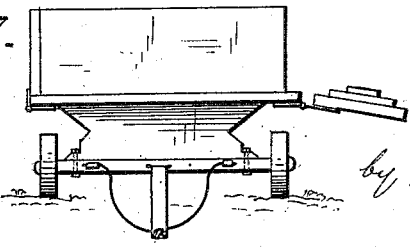
Fig. 21.
WITNESSES
J. E. Blair
E. Riley
INVENTOR
Charles M. Du Puy
by Wm. H. Ginckel
his Attorney

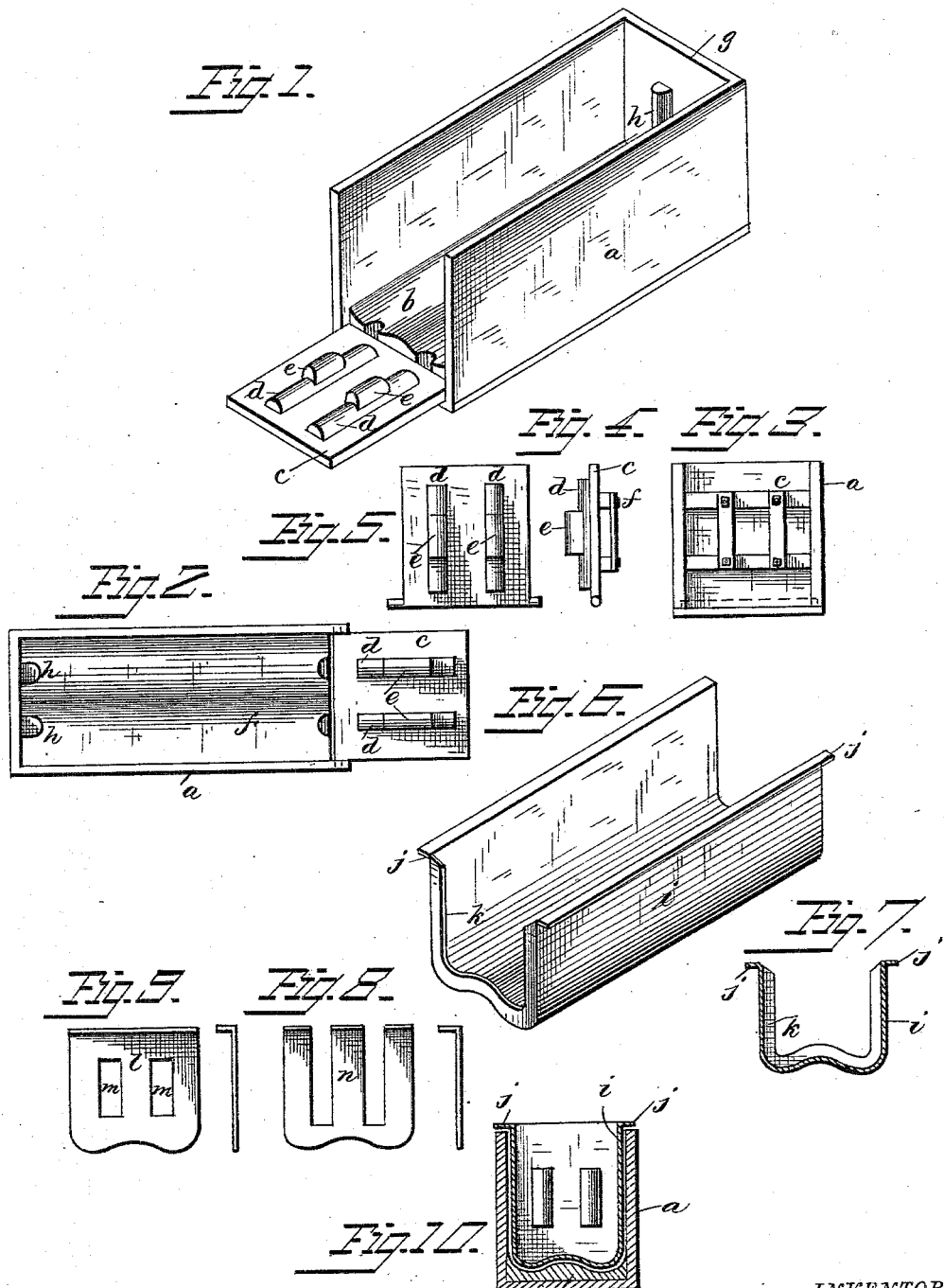

UNITED STATES PATENT OFFICE.

CHARLES M. DU PUY, OF PHILADELPHIA, PENNSYLVANIA.

MOLDING PLASTIC MATERIAL.

SPECIFICATION forming part of Letters Patent No. 296,825, dated April 15, 1884.

Application filed August 26, 1882. (No model.)

*To all whom it may concern:*

Be it known that I, CHARLES M. DU PUY, a citizen of the United States, residing at Philadelphia, in the county of Philadelphia and State of Pennsylvania, have invented certain new and useful Improvements in Molding Plastic Material, of which the following is a full, clear, and exact description.

This invention relates to a mode of and means for molding plastic material into shapes of such stability as to permit of their being easily and safely handled without resorting to artificial or other drying, and, in fact, without further treatment.

The invention is primarily designed to furnish the molded masses forming the subject-matter of my United States Letters Patent No. 243,365, dated June 28, 1881, and the application, Serial No. 59,008, filed April 21, 1882, for manufacture of iron. In these said inventions stress is laid upon the formation of the molded masses of mixed metalliferous and carbonaceous matter of such solidity, stability, and cohesiveness as to stand the handling to which they are subjected. Experience has demonstrated the necessity of forming these masses into very thin shapes, and at the same time in such manner as to confer upon them great tenacity, and I find that by subjecting them in molds to a high pressure I accomplish these requisites in the most perfect manner. As has been pointed out by me, the manufacture of iron direct can only compete with existing methods by securing a larger yield and economizing time and fuel; hence my inventions have looked to these ends, and thus to the perfecting of details of procedure, and my invention herein embodies the results of an extensive practical experience.

This invention consists in a mold and die, for use in a suitable press, shaped and arranged to produce at one operation, from plastic material, a molded mass of suitable configuration for the use to which it is to be put, and ready, without further treatment, for application to its purpose.

In the accompanying drawings, illustrating my invention, in the several figures of which like parts are similarly designated, Figure 1 is a perspective view of a mold-box with its discharge-gate open for use in molding plastic material in accordance herewith. Fig. 2 is a top plan view thereof with the gate let down and lying horizontally. Fig. 3 is an outside end view thereof at the gate end, showing a compound latch for holding the gate in place when closed. Fig. 4 is an edge view, and Fig. 5 an inner face view, of the gate. Fig. 6 is a perspective view of a sheet-iron tray in which I first lightly tamp or pack the plastic material, prior to its introduction in such tray, into the mold, as indicated in Fig. 10. Fig. 7 is a cross-section of the tray, looking from the gate, showing the turned-up end. Fig. 8 is a front elevation and edge view of end piece sometimes to be put in the tray next the gate, and Fig. 9 are similar views of a like piece to be put in the opposite end of the tray. Fig. 10 is a vertical cross-section of the mold and tray in position. Fig. 11 is a side elevation of the die, and Fig. 12 is an edge or end view thereof, another form of which die I have indicated by dotted lines in said Figs. 11 and 12. Fig. 13 is a perspective view of the form of block produced from plastic material by the mold and die herein illustrated. Fig. 14 is a vertical section on the line $x\,x$ of Fig. 13, and Fig. 15 a horizontal cross-section on the line $y\,y$ of Fig. 13. Fig. 16 is a bottom plan view of said block, Fig. 13. Fig. 17 is a plan view of an implement used for removing the tray and its molded contents from the mold-box. Fig. 18 is a perspective view of another form of molded block. Fig. 19 is a top plan view of a four-cell mold-box; and Fig. 20 is a top plan view, and Fig. 21 a front elevation, of my bogie or truck for the trays.

It is obvious that certain general principles are embodied in the matter shown in these drawings, of which the drawings are but a single and limited application, and while I do not wish to be understood as confining my invention to the said special forms, I may with propriety here state that the form of block shown in Fig. 13 embodies the most recent results of my working of the invention.

The box or mold $a$ is of metal, preferably, but may be of wood, and of a size and shape suitable to give the dimensions and configuration of block desired. I will describe this mold or box with special reference to the block shown in Fig. 13. The bottom $b$ of the box, Fig. 1, is curvilinear, in order to discharge its burden readily. Its end $c$ is hinged at and in the bottom of the sides of the box, to form a discharging or inlet gate, and this gate $c$ has the ribs $d\ d$ and projections $e\ e'$ thereof placed or formed longitudinally thereupon in a vertical direction. This gate is held closed in the box by means of a strong latch, $f$, of any approved construction. The opposite end, $g$, of the mold-box may be fixed or hinged as gate $c$, the object in hinging both ends $c$ and $g$ being to admit of the inserting of the loaded trays at one end of the mold-box and their removal from the other when the block is pressed, the mold-box always remaining under the press. The end $g$ has projections $h\ h$, standing out vertically into the box from its face and close in line with the edges of the prongs or blades of the die hereinafter referred to. The mold-box is designed to fit the bed and sides of a suitable press, by which a very heavy and powerful pressure may be obtained.

The tray $i$, herein referred to, (see Fig. 6,) is of sheet metal, by preference steel, and its bottom conforms in shape to the bottom of the mold, with upturned side walls, the longitudinal edges $j$ of which are flanged horizontally outward to afford means for supporting the tray within the mold-box upon the vertical side walls thereof. One end of this tray is provided with an inturned flange, $k$, which is arranged at the end opposite gate $c$, and receives the end piece $l$, of sheet metal, Fig. 9. This end piece $l$ is slotted at $m\ m$ to fit on the projections $h\ h$. The end piece $n$ is slotted vertically and arranged to fit at the end of the tray on the ribs $d\ d$ of the gate $c$, and said pieces $l\ n$ are employed to break the suction of the material under pressure, and so to prevent it sticking to the mold-box, thus affording easy removal; but as the mold-box becomes smooth from use, these end pieces may be dispensed with.

The die I employ is adapted to impart to the matter in the mold the kind, shape, and number of perforations, cavities, or depressions desired in the finished block. In Figs. 11 and 12 I have shown the die $o$, composed of a head, $p$, whereby it is adapted to be held in a suitable movable press-head, and from this head $p$ of the die depend the active blades or prongs $q\ q$, in number, size, and shape to produce the effects desired. In the instance shown, these blades or prongs have rounded points to form the most desirable shape inside of the plastic mass, and their shoulders $r$ next the head $p$ are both longitudinally and transversely chamfered, or beveled off sufficiently to give proper draft to facilitate the exit or clearance of the die from the mass, thereby preventing adherence of the mass to the die.

The block $s$, as the product of the mold and die herein illustrated, is formed by pressure of the die upon the plastic mass in the tray in the mold, and I have employed one to two hundred tons pressure with very marked success in solidifying the mass and expelling the air sufficiently to permit the immediate transfer of the blocks from the molds to the furnace for reduction. The cavities $t\ t$, Figs. 13 and 14, are formed in the block by the projections $h\ h$ of the mold. The cavities $u\ u$, Figs. 13, 14, and 15, are formed by the blades or prongs of the die. The bottom cross-grooves, $v\ v$, Figs. 13 and 16, are formed by the ribs $d\ d$ of the gate $c$, and the countersunk cavities $w\ w$ in said grooves are formed by the projections $e\ e$ on ribs $d\ d$, and the curvilinear back $z$ is formed by the configuration of the bottoms of the tray and mold, all at and by one operation. The conjunction of the ribs $h\ h$ and projections $e\ e$ with the blades of the die in forming the cavities $t\ t$, $w\ w$, and $u\ u$, respectively, will practically unite said cavities, or leave but a thin film between them, easily obliterated by the heat of the furnace, thereby leaving an open way through the block for circulation of heat in hastening the reduction of the metal. The object, then, of these grooves and cavities or perforations is to divide the block into comparatively thin walls, to facilitate the attack of the heat in reducing the metal mixture, and to increase the heat-exposed surfaces of the molded mixture as well at the top as sides and bottom, the transverse bottom grooves affording also means for the circulation of heat under the molded blocks as they stand upright in the furnace. The curvilinear back is provided in order that the blocks may be arranged back to back or back to side or face in the furnace without any very extended amount of contact between them, it being observed that space must exist between adjacent blocks or molded masses in the furnace in order to insure access by the heat to all portions of them.

For other forms of molded blocks, which may be shaped in accordance with this invention by obvious changes in the mold-box and die, reference may be had to the drawings of my application hereinbefore referred to.

The longitudinal cavities $u\ u$ may for a portion of their lengths extend clear through the block, and I effect this by using a die having on its blades the projections indicated by dotted lines in Figs. 11 and 12, in which case the tray will be perforated to permit the passage therethrough of said projections, and the bottom of the mold-box will be correspondingly shaped to receive them.

In practicing my invention herein I prepare the metalliferous material in the manner set forth in my prior inventions relating thereto, it being in a plastic state, and having any number of my trays $i$—say eight—arranged upon a suitable bogie prepared to receive them. (See Figs. 20 and 21 for illustration.) I shovel the mass into these trays and slightly tamp it therein. The bogie-load is then run to the press while another load is being prepared. The trays, one after another, are slid into the mold-box through its open gate, with the flanges $j\ j$ of the trays left resting on the edges or walls of the mold-box to support such trays. The gates are then shut and latched and the die dropped to press and perforate or indent the mass and form the block. The die then rising, the tray is removed by shoving it out at the back gate, if there be one, or, if the back end be fixed, by running horizontally the implement, Fig. 17, between the flanges $j\,j$ of the tray and the top edges of the side walls of the mold-box, which implement is of such length as to project beyond each end of the box, and thus afford handles, and lifting said tray and its contained burden or block by said handles from the box.

This implement may also be used in facilitating the removal of the blocks even when both ends of the box are hinged as gates. The tray being of sheet metal—steel by preference—may be then sprung from the molded block and stripped off by simply pulling apart its sides, the mass being left free on end, properly shaped, and ready for transportation to and introduction in the furnace.

The implement, Fig. 17, is simply a flat piece of metal bent into the shape of an elongated ⊔.

I desire it to be distinctly understood that the die blades or prongs and the mold-box projections may be round, square, oblong, or other shape, and their function may be the complete perforation of the blocks, or partial perforation or indentation or depression thereof, so long as they subserve the purpose of dividing the blocks into numerous thin walls, and thus increase the area for the heat attack and facilitate heat penetration; and I repeat that the forms herein shown are selected because good results have recently been obtained therefrom.

The corners of the tray may be stayed, and thus prevented from breaking, by a piece of thin sheet-iron molded to the bottom of the mold-box.

By working the aforesaid mold-box and dies I have found the great advantage of compressing the material thin, and yet so that it will stand up firmly in the furnace. The experience so obtained has demonstrated that the molded mass may be made still thinner to advantage without any more labor in molding, and enabling me to quicken the heat penetration. For example, I propose to increase the number of blades in the die to give three or more cavities, perforations, or indentations in the molded block. (See Fig. 18.) This, in the same size block as that shown in Fig. 13, will reduce the thickness of the walls from one and five-eighths inch to about one or one and one-fourth inch. Where the press will admit of it, I intend to mold four or more of these blocks at once, and for this purpose the mold-box is provided with longitudinal and cross-partitions $a'\,a^2$, respectively, Fig. 19, the latter provided with projections like on end $g$, and the gates being constructed and arranged with ribs and projections for each cell, one gate for each end, as in Fig. 1, the mold-box being simply a quadruplication of that shown in Fig. 1, except in that the substitute $a^2$ for the end $g$ is in the middle of the box. So, likewise, the mold-box may be subdivided indefinitely within the range of the press.

The bogie or truck may be made to contain one or more trays. I have shown one in Figs. 20 and 21 arranged for holding eight. Each side of the bogie-body is hinged, one side being let down in the drawings. The inside of the partitions of the bogie-body is provided each side with projections and the gates with ribs and projections to start the formation of the blocks in accordance with the shape and formation of the mold-box; but it will be understood that I do not limit the practice of my invention to any form of truck or bogie.

The pieces $l\,n$ have right-angled flanges at their upper ends, to rest on the edges of the gates when shut.

What I claim is—

1. The box or mold $a$, having the hinged end-gates, a tray, $i$, therein, and projections to indent the product, and die $o$, constructed and arranged to operate substantially as shown and described, and for the purpose specified.

2. A mold, $a$, having the bottom $b$ and ends $c\,g$, provided with internal projections to give shape to the mass being molded, the tray $i$, and end pieces, $l\,n$, and the die $o$, substantially as shown and described.

3. The combination, with the mold-box $a$, of the tray $i$, substantially as and for the purpose described.

4. The combination, with the mold-box $a$, of the tray $i$, having the edge flanges, $j\,j$, end flange, $k$, and end pieces, $l\,n$, substantially as and for the purpose described.

5. The combination, with a mold-box, $a$, and its tray $i$, of the die $o$, having blades or prongs $q$, substantially as shown and described.

6. The combination, with the mold-box $a$, of the die $o$, having blades or prongs $q$, provided with rounded or beveled points, and slightly tapering or rounded shoulders $r$, substantially as and for the purpose specified.

7. The block $s$, formed with cavities $t\,t$ and $u\,u$, grooves $v\,v$, and counter-cavities $w\,w$ therein, and the curvilinear back $z$, all substantially as and for the purpose set forth.

In testimony whereof I have hereunto set my hand this 23d day of August, A. D. 1882.

CHARLES M. DU PUY.

Witnesses:
E. H. BAILEY,
SAMUEL WOODS.